US007926666B2

(12) United States Patent
Herman et al.

(10) Patent No.: US 7,926,666 B2
(45) Date of Patent: Apr. 19, 2011

(54) ROTARY FILTRATION SYSTEM (75) Inventors: David T. Herman, Aiken, SC (US);
David N. Maxwell, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 1005 days.

(21) Appl. No.: 11/245,843

(22) Filed: Oct. 7, 2005

(65) Prior Publication Data
US 2011/0011785 A1 Jan. 20, 2011

(51) Int. Cl.
*B01D 33/00* (2006.01)
(52) U.S. Cl. .............. 210/404; 210/321.67; 210/321.68; 210/321.87; 210/331; 210/459; 210/402
(58) Field of Classification Search .................. 210/332, 210/333.01, 337, 338, 411, 416.1, 456, 459, 210/460, 483, 485, 333.1, 791, 321.67, 321.68, 210/321.75, 321.84, 330, 331, 346, 347, 210/486, 402–404, 321.87
See application file for complete search history.

(56) References Cited

U.S. PATENT DOCUMENTS

| | | | | |
|---|---|---|---|---|
| 1,538,980 | A | * 5/1925 | Genter | 210/216 |
| 1,906,417 | A | * 5/1933 | Hartley et al. | 210/314 |
| 2,103,572 | A | * 12/1937 | Wells | 210/347 |
| 2,799,397 | A | * 7/1957 | Berline | 210/331 |
| 3,696,932 | A | 10/1972 | Rosenberg | |
| 3,884,813 | A | * 5/1975 | Donovan et al. | 210/297 |
| 3,907,681 | A | * 9/1975 | Corrigan et al. | 210/777 |
| 3,977,685 | A | 8/1976 | Greenawalt et al. | |
| 4,890,851 | A | 1/1990 | Avard et al. | |
| 5,176,829 | A | * 1/1993 | Drori | 210/346 |
| 5,211,846 | A | 5/1993 | Kott et al. | |
| 5,679,249 | A | * 10/1997 | Fendya et al. | 210/321.63 |
| 5,891,222 | A | * 4/1999 | Hilgendorff et al. | 96/7 |
| 6,165,365 | A | 12/2000 | Salyer et al. | |
| 6,168,724 | B1 | 1/2001 | Hurwitz | |

(Continued)

FOREIGN PATENT DOCUMENTS

JP   05137975 A   *   6/1993

OTHER PUBLICATIONS

Definition of "vertical", Jul. 11, 2009, Merriam-Webster's Online Dictionary, pp. 1-2.*

(Continued)

*Primary Examiner* — Tony G Soohoo
*Assistant Examiner* — David C Mellon
(74) *Attorney, Agent, or Firm* — J. Bennett Mullinax, LLC (57) ABSTRACT

A rotary filtration apparatus for filtering a feed fluid into permeate is provided. The rotary filtration apparatus includes a container that has a feed fluid inlet. A shaft is at least partially disposed in the container and has a passageway for the transport of permeate. A disk stack made of a plurality of filtration disks is mounted onto the shaft so that rotation of the shaft causes rotation of the filtration disks. The filtration disks may be made of steel components and may be welded together. The shaft may penetrate a filtering section of the container at a single location. The rotary filtration apparatus may also incorporate a bellows seal to prevent leakage along the shaft, and an around the shaft union rotary joint to allow for removal of permeate. Various components of the rotary filtration apparatus may be removed as a single assembly.

20 Claims, 5 Drawing Sheets

U.S. PATENT DOCUMENTS

| | | |
|---|---|---|
| 6,391,199 B1 * | 5/2002 | Diemer et al. ............ 210/330 |
| 6,416,666 B1 | 7/2002 | Salyer et al. |
| 6,478,969 B2 | 11/2002 | Brantley et al. |
| 6,495,037 B1 | 12/2002 | Schuyler |
| 6,613,231 B1 * | 9/2003 | Jitariouk ............ 210/650 |
| 6,739,459 B1 | 5/2004 | Hartmann |
| 6,875,352 B1 | 4/2005 | Diemer et al. |
| 2004/0159603 A1 * | 8/2004 | Boulnois et al. ............ 210/331 |

OTHER PUBLICATIONS

Machine translation of JP 05137975 A, accessed Dec. 14, 2009, pp. 1-4.*

* cited by examiner

ROTARY FILTRATION SYSTEM

STATEMENT AS TO RIGHTS TO INVENTIONS MADE UNDER FEDERALLY SPONSORED RESEARCH AND DEVELOPMENT

This invention was made with Government support under Contract No. DE-AC09-96-SR18500 awarded by the United States Department of Energy. The Government has certain rights in the invention.

FIELD OF THE INVENTION

The present invention relates generally to filtration systems. More particularly, the present invention involves a rotary filtration system that is designed for serviceability and reliability and is capable of use in an industrial environment such as a nuclear plant.

BACKGROUND

Filtration systems are used in order to clean fluids such as waste water. The waste water travels through one or more filtration elements from which particles in the waste water are removed. Water that is cleaned in such a manner is often referred to as permeate. Filtration systems may be configured so that all of the waste water is filtered into permeate. Alternatively, filtration systems can be designed in which a quantity of water with a higher concentration of particles, known as concentrate, is produced in addition to an amount of permeate.

Particle build-up causes filters to lose their effectiveness. In some instances, particles block pores on the surface of the filter elements thus preventing or slowing water from flowing through. Filtration systems have been designed in order to minimize the build-up of particles on the outer surfaces of the filtration elements. One such design has a plurality of filtration disks arranged coaxially along a hollow shaft. Separator elements are positioned between the filtration disks and remain stationary when the hollow shaft and filtration disks rotate. Relative rotation between the separator elements and the filtration disks causes a flow pattern to be established that acts to sweep particles off of the outer surface of the filtration disks. Waste water is filtered through the filtration disks while particles that would otherwise accumulate on the outer surface thereof are removed.

Although capable of accomplishing their intended purpose, current rotary filtration systems are not well designed for use in an industrial environment such as a nuclear plant. For example, in current filtration systems the filtration disks remain in place during servicing of the unit. This type of arrangement requires a large amount of labor to access the various filtration disks and exposes the technician to waste water while working on the unit. It is also the case that seals on the hollow shaft located below the filtration disks on current rotary filtration systems are subject to failure. Particles present in the waste water eventually propagate downward along the hollow shaft and build-up on the aforementioned seals thus causing their failure.

Current filtration systems employ filtration disks that are constructed of components joined by an epoxy and that include polymeric substances. Although suitable for their intended purpose, current filtration disks are susceptible to failure when employed in harsh environments such as when exposed to waste water that contains radioactive elements.

Accordingly, there remains room for variation and improvement within the art.

SUMMARY

Various features and advantages of the invention will be set forth in part in the following description, or may be obvious from the description, or may be learned from practice of the invention.

The present invention provides for a rotary filtration apparatus that employs a disk stack made of a plurality of filtration disks. Feed water may be filtered into permeate by the filtration disks and then transported through a passageway of a shaft to a permeate outlet. The rotary filtration apparatus can be constructed to function in an industrial application such as when the filtering of radioactive feed water is desired. Additionally or alternatively, the rotary filtration apparatus may be designed so that components such as the filtration disk, seals and bushings can be removed in a single assembly. In this regard, the filtration disk and associated wear components can be cleaned off-site while a replacement assembly is inserted into the rotary filtration apparatus to continue filtration. Additionally, the rotary filtration apparatus may employ a bellows seal and an around the shaft union rotary joint in order to have a more robust sealing arrangement.

In accordance with one exemplary embodiment, a rotary filtration apparatus is provided that has a container with a feed fluid inlet. A shaft is at least partially disposed in the container and has a passageway through which permeate may pass. A disk stack made of a plurality of filtration disks is mounted onto the shaft and rotates therewith. The filtration disks have a steel base plate that carries at least one membrane for filtering fluid.

The present invention also provides for a rotary filtration apparatus as immediately discussed in which steel wire mesh is disposed on either side of the steel base plate and in which a membrane is located on each one of the steel wire mesh. Further, the filtration disks may have rings on either end and may be held together though welding. The membrane, and rings if present, may be made of steel in certain exemplary embodiments.

Also provided for in accordance with one exemplary embodiment is a rotary filtration apparatus as discussed above in which the shaft is disposed though apertures defined in the steel base plates. The steel base plates define a notch in order to define a flow path through the filtration disks of the disk stack.

The present invention also provides for an exemplary embodiment as previously discussed in which a plurality of separator plates are attached to tie rods and positioned between the filtration disks so that the filtration disks and separator plates are capable of rotating relative to one another. Additionally, the shaft, disk stack, separator plates and tie rods may be configured with one another to be removable from the container as a single assembly.

It is at least one aspect of at least one embodiment of the present invention to provide for a rotary filtration apparatus with a container that has a feed fluid inlet in communication with a filtration section. The apparatus also has a shaft at least partially disposed in the container that penetrates the filtering section at only a single location. A disk stack is present and is made of a plurality of filtration disks for filtering feed fluid into permeate. The filtration disks are mounted onto and rotate with the shaft.

The present invention also provides for a rotary filtration apparatus as immediately discussed in which a bearing receives an end of the shaft to allow for rotation. A further exemplary embodiment exists as immediately mentioned in which the container has a concentrate outlet and in which a bottom plate, that carries the bushing, is located a distance from the bottom of the container to define a space. The bottom plate has an aperture for the transport of concentrate into the space and out of the concentrate outlet.

Another exemplary embodiment exists in a rotary filtration apparatus as discussed above in which the shaft and disk stack are configured as a single assembly for removal from the container. Additionally or alternatively, the rotary filtration apparatus may include a plurality of separator plates attached to tie rods and disposed between the filtration disks.

The present invention also provides for a rotary filtration apparatus as previously discussed in which the filtration disks have a steel base plate that carries a steel wire mesh on either side. Each of the steel wire mesh carries a steel membrane for filtering of a fluid.

Another exemplary embodiment of a rotary filtration apparatus exists as previously discussed in which a bellows seal is located on one side of the disk stack and surrounds a portion of the length of the shaft in order to prevent leakage. Additionally or alternatively, the rotary filtration apparatus may have an around the shaft union rotary joint that surrounds a portion of the length of the shaft. The around the shaft union rotary joint has a port in communication with a permeate outlet of the shaft to allow permeate to flow from the passageway out of the permeate outlet and then out of the port.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to about 7 also includes a limit of up to about 5, up to about 3, and up to about 4.5.

The present invention provides for a rotary filtration apparatus 10 that is capable of filtering fluid such as waste water in an industrial environment. The rotary filtration apparatus 10 includes filtration disks 22 that are capable of use with radioactive waste water. The filtration disks 22 are arranged in a disk stack 20 that may be removed, along with other components of the rotary filtration apparatus 10, as a single assembly 58 during servicing. The assembly 58 may be transported offsite for cleaning while an additional assembly 58 is inserted into the filtration apparatus 10 to minimize downtime. Seals and components of the filtration apparatus 10 are also selected and positioned in order to reduce wear and hence further minimize downtime and operation costs.

Figure 1:
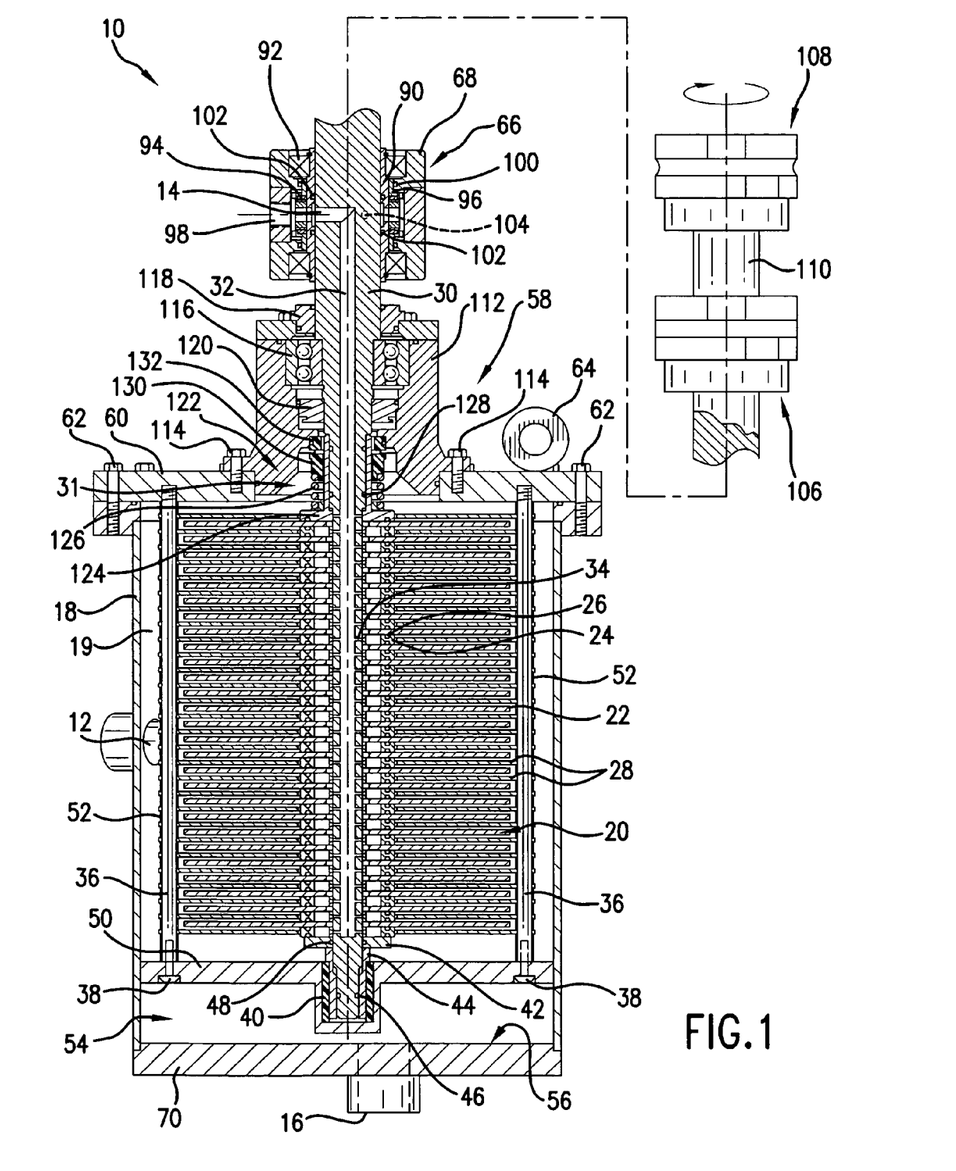
FIG. 1 is a cross-sectional view of a rotary filtration apparatus in accordance with one exemplary embodiment of the present invention.

The present rotary filtration apparatus 10 improves upon current rotary filtration devices such as the one disclosed in U.S. Pat. No. 6,165,365 entitled "Shear Localized Filtration System" by Salyer et al. and assigned to Spintek Systems, LP. U.S. Pat. No. 6,165,365 is incorporated by reference herein in its entirety for all purposes. FIG. 1 is a cross-sectional view of the rotary filtration apparatus 10 in accordance with one exemplary embodiment of the present invention. The rotary filtration apparatus 10 includes a container 18 through which a fluid, such as waste water from a nuclear plant, may be introduced by way of a feed fluid inlet 12. A plurality of filtration disks 22 are employed in order to clean the waste water so that clean water, permeate, may exit the rotary filtration apparatus 10 out of a permeate outlet 14. Concentrate exits the bottom of the container 18 through a concentrate outlet 16.

The filtration disks 22 are arranged in a disk stack 20 that includes a plurality of O-ring flanges 24 positioned between the filtration disks 22. O-rings 26 are located on the O-ring flanges 24 to ensure that fluid travels through the filtration disks 22. Filtering of the fluid removes particles hence resulting in permeate that travels through apertures 30 and into a passageway such as a bore 32 of shaft 30. Positioned between the filtration disks 22 are a plurality of separator plates 28. The separator plates 28 have through apertures (not shown) that allow fluid to travel upwards and downwards in FIG. 1. The filtration disks 22 may each have from four to ten apertures in accordance with various exemplary embodiments. A plurality of spacers 52 located on tie rods 36 may be used to position and/or hold the separator plates 28. The tie rods 36 may be provided in any number, for example four tie rods 36 are employed in one exemplary embodiment.

The shaft 30 along with the filtration disks 22 rotate during operation. The separator plates 28 remain stationary so that the filtration disks 22 rotate next to and relative to the separator plates 28. This arrangement provides a desired fluid flow between the filtration disks 22 and separator plates 28 that acts to sweep particles off of the surface of the filtration disks 22. This sweeping extends the useful life of the filtration disks 22 by reducing build-up of particles that clog pores in the filtration disks 22.

The rotary filtration apparatus 10 includes a bushing 40 recessed within a bottom plate 50. The tie rods 36 are secured to the bottom plate 50 by way of stainless steel cap screws 38. The bushing 40 may be a Series Q100181 bushing manufactured by Graphite Metallizing Corp. located at 1050 Nepperhan Ave., Yonkers, N.Y. 10703-1421. The bushing 40 connects the shaft 30 and the bottom plate 50 to support and enable rotation of the shaft 30. The bushing 40 also acts to maintain alignment of the shaft 30. The bottom of the disk stack 20 lays on top of a washer 42 that is co-axial with shaft 30 and which in turn lays on top of a nut 44. The nut 44 is likewise co-axial with shaft 30 and contacts a portion of the end of shaft 30. Nut 44 allows shaft 30 to rotate with respect to the bottom plate 50 by acting as a rotary component of bushing 40. O-rings 46 and 48 are positioned between an end portion of shaft 30 and nut 44. The O-rings 46 and 48 prevent fluid from entering and damaging the bushing 40. The O-rings 46 and 48 create a static seal in that the two components that the O-rings 46 and 48 seal, the shaft 30 and nut 44, do not rotate with respect to one another.

The shaft 30 penetrates the filtering section 19 of the container 18 at only a single location 31. Use of the bushing 40 eliminates seals that would otherwise be present at some point below the container 18 due to an opening into container 18 through which the shaft 30 would exit. A seal at this location may be problematic in that solids from the concentrate could be moved downward by gravity and cause the seal to fail. It is to be understood, however, that other arrangements that do not employ the bushing 40 are possible to allow the shaft 30 to penetrate the filtering section 19 at only a single location. Additionally, the shaft 30 may penetrate the filtering section 19 at more than one location in accordance with other exemplary embodiments.

The shaft 30 does not have an exit for permeate out of the end located in the bushing 40. As such, the rotary filtration apparatus 10 is configured so that permeate exits at a single permeate outlet 14. However, it is to be understood that in accordance with other exemplary embodiments that the rotary filtration apparatus 10 may be designed so that permeate is allowed to exit the shaft 30 at other or additional locations such as at the bushing 40.

The bottom plate 50 is located a distance from the bottom 56 of container 18 to define a space 54. The bottom plate 50 has one or more apertures (not shown) so that fluid, in this instance concentrate, may flow through the bottom plate 50 and into the space 54. The apertures in the bottom plate 50 may be numbered or sized in a similar fashion to those in the separator plates 28 as previously discussed. Concentrate flows through the space 54 and out of the concentrate outlet 16. The space 54 minimizes the possibility of build-up of solids from the concentrate and thus helps ensure the disk stack 20 is properly seated when placed into the container 18.

Figure 2:
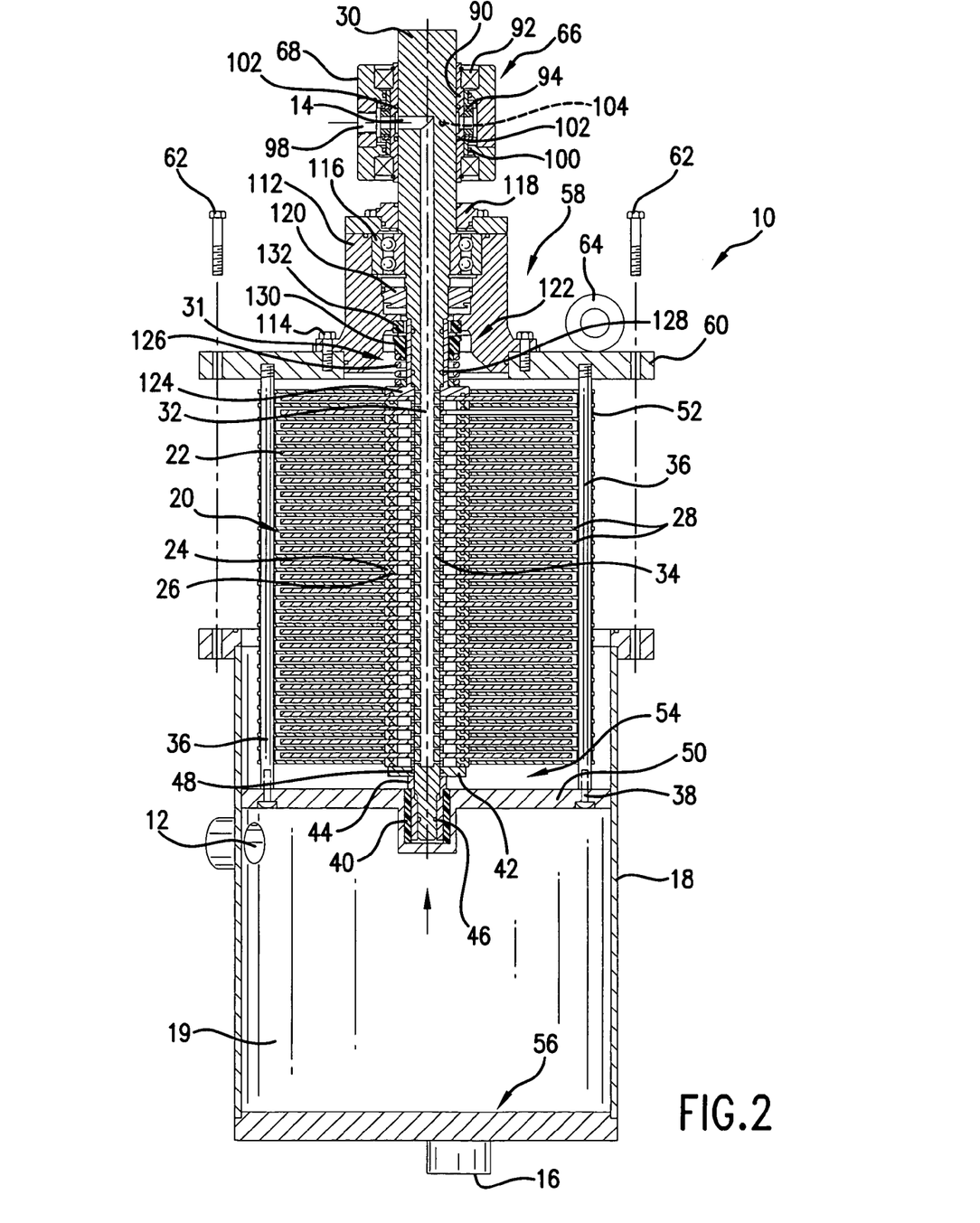
FIG. 2 is a cross-sectional view of the rotary filtration apparatus of FIG. 1 in which various components are removed as a single assembly for maintenance.

The rotary filtration apparatus 10 is designed in a modular fashion so that an assembly 58 may be removed from the container 18 as a single unit and transported to a remote location, if desired, for cleaning. Removal of the assembly 58 is shown in FIG. 2. This functionality reduces the technician's exposure to potentially harmful waste water in the rotary filtration apparatus 10 during servicing as each of the filtration disks 22 in the disk stack 20 do not need to be disassembled and worked with on site. To remove the assembly 58, bolts 62 that connect vessel lid 60 and container 18 are removed. The assembly 58 can be lifted up from the container 18 without having to disconnect lines running into and out of the feed fluid input 12 and the concentrate outlet 16. A lifting eye 64 may be employed for this procedure.

The tie rods 36 may be permanently connected to the vessel lid 60 through welding. In alternative exemplary embodiments, however, the tie rods 36 are removable from the vessel lid 60. The tie rods 36 act to tie various components together so that the assembly 58 includes the disk stack 20, separator plates 28, shaft 30 and bushing 40. Other portions of the rotary filtration apparatus 10 such as the around the shaft union rotary joint 66, housing 112 and related components may also be included in the assembly 58 and simultaneously removed from the container 18. All of the common wear items in the rotary filtration apparatus 10 such as the bushing 40, seals 102 and seal 122 can be removed in a single assembly 58 for servicing.

Figure 3:
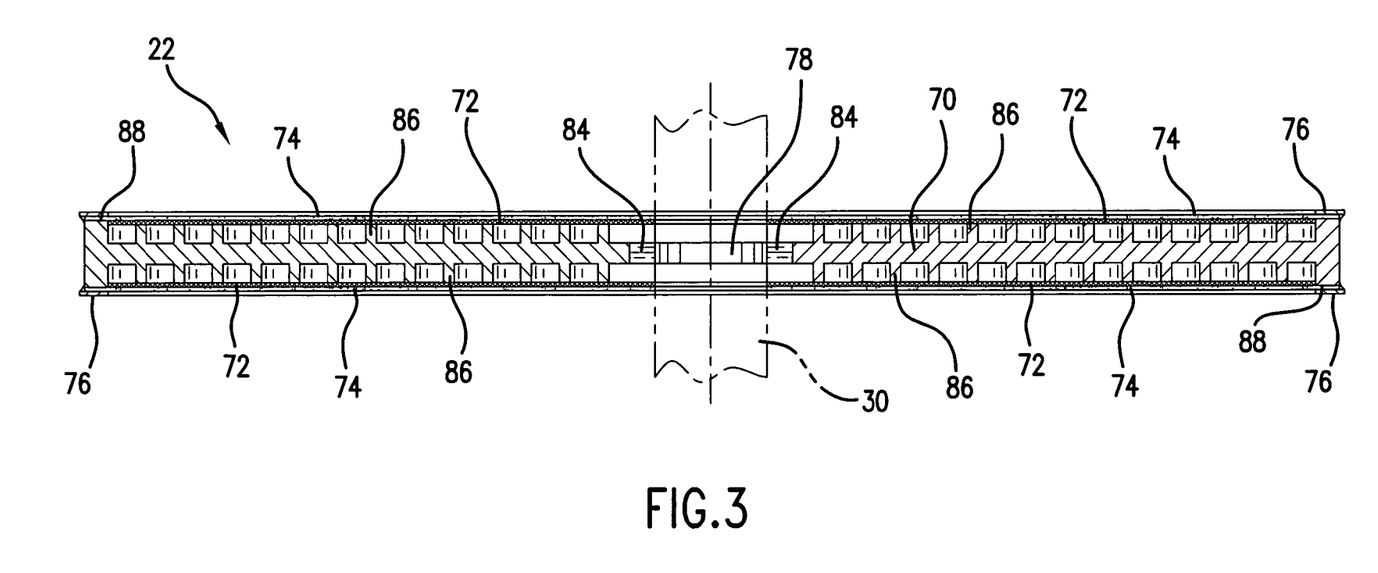
FIG. 3 is a cross-sectional view of a filtration disk in accordance with one exemplary embodiment of the present invention.
Figure 4:
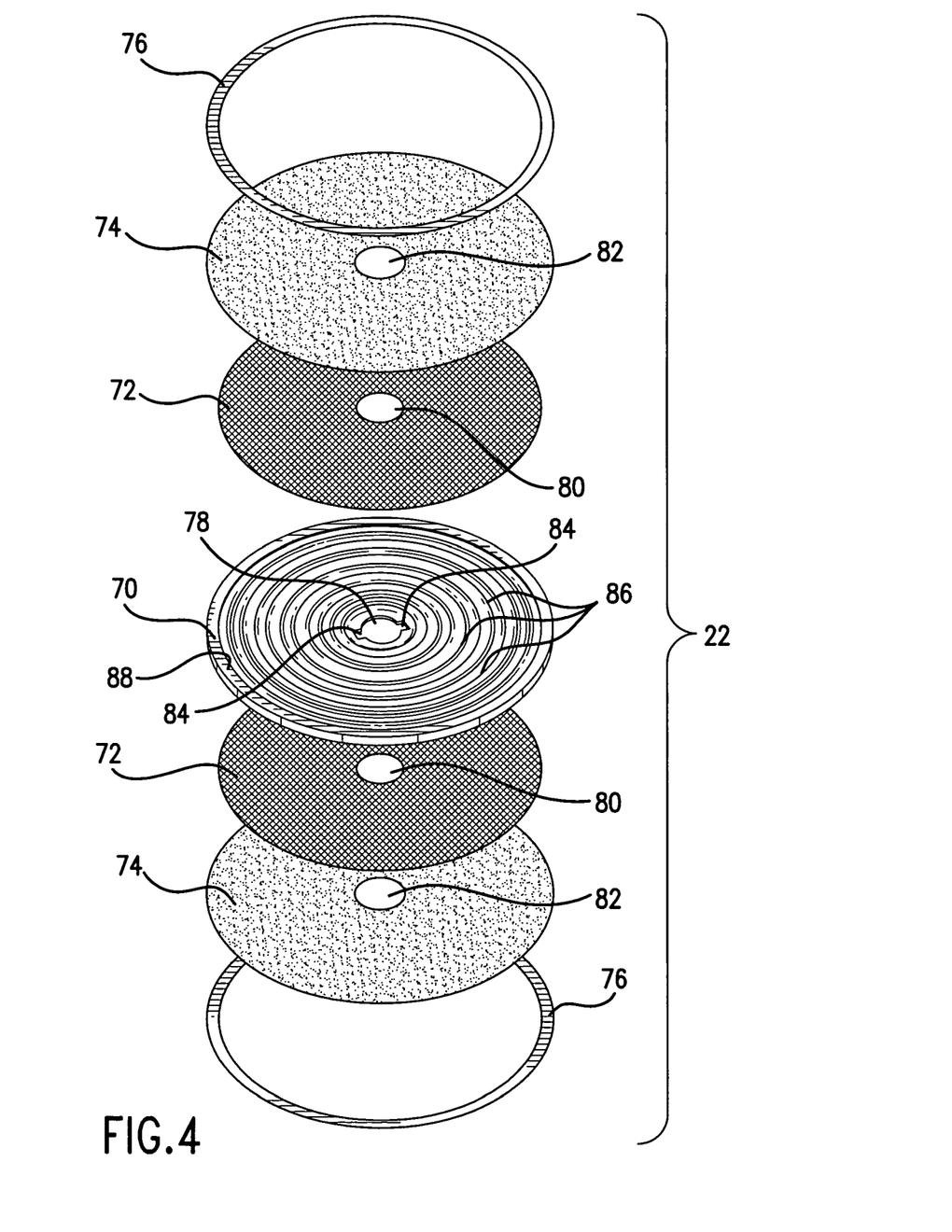
FIG. 4 is an exploded assembly view of the filtration disk of FIG. 3.

The filtration disk 22 can be constructed to operate in an industrial environment such as those utilizing radioactive waste water. FIGS. 3 and 4 show the various components that make up the filtration disk 20 in accordance with one exemplary embodiment. A base plate 70 is included that is made of stainless steel. The base plate 70 has an oval shaped aperture 78 with a pair of notches 84 located along the sides of the oval parallel to its major axis. The base plate 70 also has a series of concentric rings 86 and a lip 88 located on its outer circumference. Wire mesh 72 is also included in the filtration disk 22 and has through aperture 80 that aligns with aperture 78 when assembled. The wire mesh 72 is used as a flow carrier and is likewise constructed out of stainless steel. In accordance with one exemplary embodiment, the base plate 70 is machined to receive the thickness of the wire mesh 72 and to size the lip 88 a length of up to three eighths of an inch.

Membranes 74 with apertures 82 that align with apertures 78 and 80 also make up part of the filtration disk 22. The membranes 74 may be made out of a variety of materials such as a polymeric membrane, a porous ceramic, or a sintered metal. In accordance with one exemplary embodiment, the membranes 74 are made of stainless steel. During assembly, the membranes 74 are positioned so that the wire mesh 72 has the base plate 70 on one side and a membrane 74 on the other.

A ring 76 is also included in the filtration disk 22 and may also be made of stainless steel. The ring 76 may have a thickness of 0.02 inches and is positioned on the outer diameter of the assembled base plate 70, wire mesh 72 and membrane 74. At this point in time, the components may be clamped together to maintain contact between the base plate 70, wire mesh 72 membrane 74 and ring 76. Next, tack welds may be made to further secure the aforementioned components before applying a final sealing weld. In this regard, an electron beam welder may be used to make the final sealing weld to one side of the filtration disk 22. The filtration disk 22 can then be flipped over so that the opposite side is likewise welded using the electron beam welder. It is to be understood, however, that the aforementioned construction of the filtration disk 22 is but one exemplary embodiment and that other methods of construction are possible. The use of stainless steel components such as the base plate 70 and the wire mesh 72 along with an assembly method that employs welding enables the filtration disks 22 to be used in harsh environments such as those involving radioactive waste water.

The filtration disks 22 may be used as replacement parts in current rotary filtration devices. As various components of the filtration disks 22 are made of stainless steel, the resulting disk stack 20 may be too heavy in weight. The thickness of the center support of the filtration disks 22, for instance the thickness of the center of the base plate 70, can be reduced in order to control the weight of the disk stack 20. Maintaining the same weight of the disk stack 20 with those in current rotary filtration devices allows the rotary filtration apparatus 10 to have the same power requirement and wear on moving parts. Additionally, the filtration disks 22 can be made lighter than filtration disks on current rotary filtration devices so that more filtration disks 22 can make up the disk stack 20 to increase filtration of the waste water. In this instance, the spacers 52 and separator plates 28 can be adjusted to accommodate the increased numbers of filtration disks 22. In accordance with one exemplary embodiment, up to twenty percent more filtration area can be realized in the present rotary filtration apparatus 10 than in current rotary filtration devices.

Modification of the thickness of the filtration disks 22 from current filtration disks in existing rotary filtration devices can potentially block the apertures 34 and prevent permeate from entering the bore 32 of shaft 30. One or more notches 84 are provided in the base plate 70 with aperture 78 in order to prevent the possibility of blocking the apertures 34. Here, permeate is allowed to flow through the base plate 70 and enter the apertures 34 as the presence of the notches 84 ensures the base plate 70 is not placed in contact with the shaft 30 proximate to the aperture 34. Additionally, the notches 84 create a flow path through all of the filtration disks 22 to allow permeate to flow through a path of least resistance into the bore 32 of shaft 30.

Referring back to FIG. 1, the shaft 30 is coupled to a drive shaft 110 by way of a coupler 106. The drive shaft 110 has a drive pulley 108 that is driven by a belt (not shown) in order to impart rotational motion to the shaft 30. The rotary filtration apparatus 10 has both the drive mechanism for shaft 30 and the permeate outlet 14 located on one side of the container 18. Although shown as using a drive pulley 108, other exemplary embodiments need not employ a drive pulley 108 but may use a motor that is directly coupled to the shaft 30.

Figure 5:
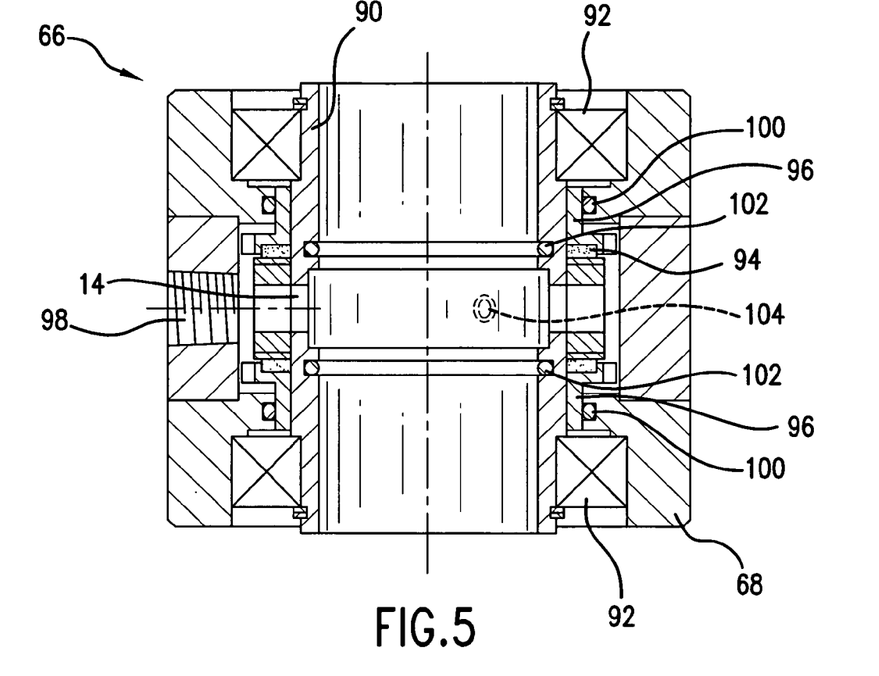
FIG. 5 is a cross-sectional view of an around the shaft union rotary joint used in accordance with one exemplary embodiment of the present invention.

FIG. 5 is a cross-sectional close up view of a portion of the rotary filtration apparatus 10 of FIG. 2 that shows the around the shaft union rotary joint 66. The around the shaft union rotary joint 66 accommodates rotation of the shaft 30 and has a stationary housing 68 that can be hard piped to receive permeate from the permeate outlet 14. The around the shaft union rotary joint 66 can be a one-passage rotary union manufactured by Blakeslee Technologies, Inc. of Olean, N.Y. 14760 or by Deublin Company, of in Waukegan, Ill. 60085-6747. However, it is to be understood that other connections may be used instead of the rotary unions of Blakeslee Technologies, Inc. and Deublin Company in accordance with other exemplary embodiments. A portion of the shaft 30 is received within a rotor 90 of the around the shaft union rotary joint 66 and is secured thereto by way of set screws 104. The rotor 90 has a pair of seals 102 on either side axially of the permeate outlet 14 to prevent leakage. The seals 102 experience less wear from exposure to permeate than if the seals 102 were exposed to solids in concentrate. Additionally, the around the shaft union rotary joint 66 may also enable various rotating components to be configured for removal from the container 18 as a single assembly 58.

The around the shaft union rotary joint 66 allows the drive shaft 30 to go through the around the shaft union rotary joint 66. The around the shaft union rotary joint 66 allows for a single penetration to be made into the container 18 since the shaft 30 can be driven from the same side of the container 18 as the location of permeate removal. It could be the case that the rotary filtration apparatus 10 is arranged so that a standard rotary joint is used instead of the around the shaft union rotary joint 66. Here, the rotary joint "dead ends" and may require the shaft 30 to be driven from the opposite side of the container 18 thus requiring a separate penetration into the container 18. The use of a separate penetration requires an additional seal that is exposed to concentrate and thus subject to possible premature failure. The around the shaft union rotary joint 66 thus eliminates a seal that is exposed to concentrate and instead employs a seal or seals 108 that are exposed to permeate. Additionally, although described as an around the shaft union rotary joint 66, the joint 66 need not be an around the shaft union rotary joint but may instead be a "dead end" joint such as a rotary joint or rotary union in accordance with certain exemplary embodiments.

A pair of roller bearings 92 are included in the around the shaft union rotary joint 66 to allow rotation of the rotor 90 with respect to the bearing housing 68. Carbon graphite rings 94 accommodate rotation between the rotor 90 and inserts 96 that are stationary with respect to the bearing housing 68. O-rings 100 are positioned in order to prevent permeate from leaking into and damaging the bearings 92. Alignment of the permeate outlet 14 and the port 98 during rotation of the shaft 30 allows permeate to flow from the port 98 to associated piping that may be either flexible tubing or hard pipe.

A housing 112, is connected to the vessel lid 60 by a series of bolts 114. As shown in more detail in FIG. 6, the housing 112 holds a bearing 116 and a bellows seal 122 that function to allow rotation of the shaft 30 and prevent leakage of fluid out of the container 18 through the vessel lid 60. The bearing 116 is mounted to the inside of the housing 112 and is protected from fluid damage by a pair of bearing isolators 118 and 120 on either side. A top hub 124 surrounds the shaft 30 and engages a pair of O-ring seals 128. The O-ring seals 128 are seated on the shaft 30 and prevent leakage between the shaft 30 and top hub 124. A seal spring 126 engages the top hub 124 and urges the bellows 130. The bellows 130 grips the rotating shaft 30 and the primary mechanical seal 132. The bellows 130 compensates for any misalignment or travel of shaft 30. Additionally, as the primary mechanical seal 132 wears the bellows 130 also acts as a spring to keep the seal faces of the primary mechanical seal 132 together.

Figure 6:
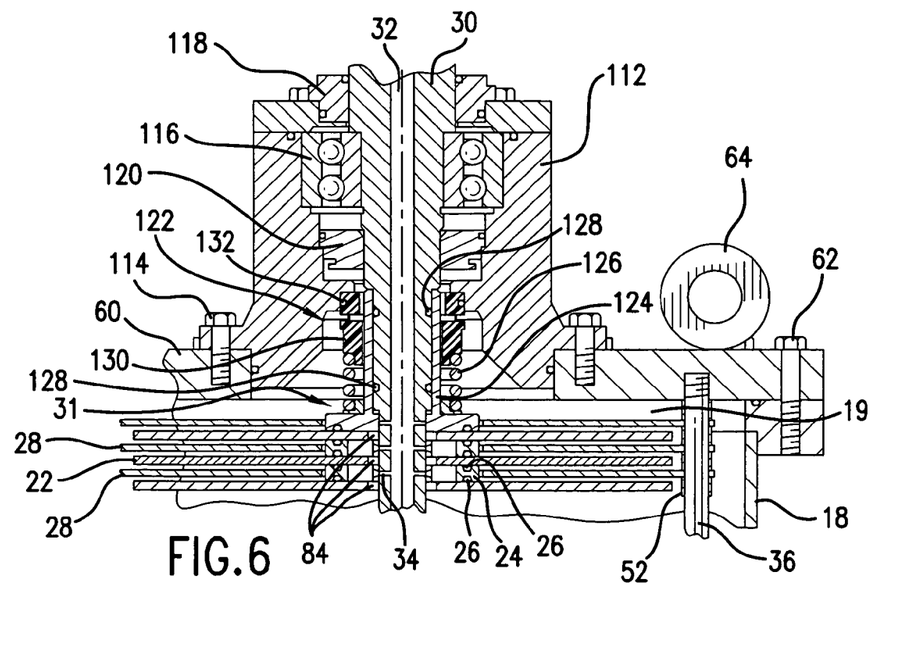
FIG. 6 is a cross-sectional view of a bellows seal and associated components used in accordance with one exemplary embodiment of the present invention.

The bellows seal 122 does not employ O-rings that wear from sliding along the shaft 30. Additionally, the bellows seal 122 may be used without the need for a water recirculation system. The bellows seal 122 may use the fluid that is being filtered itself as a coolant so that external water is not necessary and consequently will not leak into the container 18. The bellows seal 122 may be a more robust sealing arrangement suitable for use in applications involving the filtering of radioactive waste water. The bellows seal 122 may be a #1250 elastomer bellows seal manufactured by John Crane, Inc. having offices at 111 Industry Drive, Pittsburgh, Pa. However, an all metal bellows seal 122 may be used in accordance with other exemplary embodiments. Another exemplary embodiment of a bellows seal 122 that may be employed can be found in U.S. Pat. No. 4,890,851 entitled "Bellows Seal with Vibration Damper" by Avard et al. and assigned to Durametallic Corporation. U.S. Pat. No. 4,890,851 is incorporated by reference herein in its entirety for all purposes. Although described as employing a bellows seal 122, it is to be understood that the bellows seal 122 is not present in certain exemplary embodiments of the present invention.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A rotary filtration apparatus, comprising:
a container having a feed fluid inlet, wherein said container has a side wall, and wherein a bottom plate, a lid, and said side wall define a filtering section, wherein said container has a container base plate that contacts said side wall, and wherein a space is at least partially defined by an upper surface of said container base plate, an inner surface of said side wall, and a lower surface of said bottom plate;
a shaft at least partially disposed in said container, said shaft defining a passageway for the transport of permeate, wherein the permeate is transported out of said container through said lid;
a disk stack made of a plurality of filtration disks mounted onto said shaft such that rotation of said shaft causes rotation of said filtration disks, wherein said filtration disks have a steel base plate that carries at least one membrane configured to filter a fluid, wherein said disk stack is located between said lid and said bottom plate, wherein feed fluid enters said filtering section through said side wall, and wherein concentrate exits said filtering section through said bottom plate; and
a plurality of tie rods that contact both said bottom plate and said lid;
wherein the space receives concentrate from said filtering section that passes through said bottom plate, and wherein the space does not receive permeate from the passageway of said shaft;
wherein said disk stack, said tie rods, and said bottom plate are located between said container base plate and said lid;
wherein said bottom plate has an outer side surface that directly faces said inner surface of said side wall, and wherein said bottom plate defines a recess into which an end of said shaft is located, wherein fluid is prevented from exiting through said bottom plate at said recess.

2. The rotary filtration apparatus as in claim 1, wherein said filtration disks have a steel wire mesh disposed between said steel base plate and said membrane.

3. The rotary filtration apparatus as in claim 1, wherein said filtration disks have steel wire mesh disposed on either side of said steel base plate, and wherein two membranes are present and positioned such that one of said steel wire mesh is disposed between said steel base plate and one of said membranes and the other said steel wire mesh is disposed between said steel base plate and the other one of said membranes.

4. The rotary filtration apparatus as in claim 3, wherein said filtration disks have rings on both ends and wherein said rings, said steel wire mesh, said two membranes and said steel base plate are welded together.

5. The rotary filtration apparatus as in claim 3, wherein said filtration disks have steel rings on both ends and wherein said membranes are made of steel, wherein one of said membranes is disc shaped and wherein one of said steel rings extends radially beyond said disc shaped membrane.

6. The rotary filtration apparatus as in claim 1, wherein steel base plates of said filtration disks define an aperture through which said shaft is disposed, and wherein said steel base plates of said filtration disks define a notch to define a flow path through said filtration disks of said disk stack, wherein said notch is located at said aperture such that said notch and said aperture directly contact one another and define a continuous opening.

7. The rotary filtration apparatus as in claim 1, further comprising a plurality of separator plates disposed between said filtration disks, wherein said separator plates are attached to said tie rods such that rotation of said filtration disks causes relative rotation between said filtration disks and said separator plates.

8. The rotary filtration apparatus as in claim 7, wherein said shaft, said disk stack, said separator plates and said tie rods are configured for removal from said container as a single assembly.

9. The rotary filtration apparatus as in claim 1,
wherein said bottom plate defines an aperture for the passage of concentrate therethrough, wherein said feed fluid inlet is located in said side wall such that said feed fluid inlet does not extend through said bottom plate; and further comprising:
a bushing carried by said bottom plate and receiving said shaft.

10. The rotary filtration apparatus as in claim 1, further comprising a bellows seal located on one side of said disk stack and surrounding a portion of the length of said shaft.

11. The rotary filtration apparatus as in claim 1, further comprising an around the shaft union rotary joint surrounding a portion of the length of said shaft, wherein said around the shaft union rotary joint has a port for communication with a permeate outlet of said shaft such that said around the shaft union rotary joint and said shaft are configured to allow permeate to flow from said passageway to said permeate outlet and then out of said port of said around the shaft union rotary joint.

12. A rotary filtration apparatus, comprising:
a container having a feed fluid inlet in communication with a filtering section of said container wherein said filtering section is defined by a side wall of said container, a bottom plate, and a lid, wherein said container has a container base plate that contacts said side wall, and wherein a space is at least partially defined by an upper surface of said container base plate, an inner surface of said side wall, and a lower surface of said bottom plate;
a shaft at least partially disposed in said container such that said shaft penetrates said filtering section at only one location, said shaft defining a passageway for the transport of permeate, wherein said bottom plate is arranged with respect to said shaft such that the axis of rotation of said shaft extends through said bottom plate, and wherein said bottom plate is not penetrated at the location where the axis of rotation of said shaft extends through said bottom plate, wherein said bottom plate has an outer side surface that directly faces said inner surface of said side wall, and wherein said bottom plate defines a recess into which an end of said shaft is located, wherein fluid is prevented from exiting through said bottom plate at said recess;
a disk stack made of a plurality of filtration disks mounted onto said shaft such that rotation of said shaft causes rotation of said filtration disks, wherein said filtration disks are configured to filter feed fluid into permeate;
wherein the permeate is transported out of said container through said lid, wherein said disk stack is located between said lid and said bottom plate, wherein feed fluid enters said filtering section through said side wall, and wherein concentrate exits said filtering section through said bottom plate;
a plurality of tie rods that contact both said bottom plate and said lid;
wherein the space receives concentrate from said filtering section that passes through said bottom plate, and wherein the space does not receive permeate from the passageway of said shaft;

wherein said disk stack, said tie rods, and said bottom plate are located between said container base plate and said lid.

13. The rotary filtration apparatus as in claim 12, further comprising a bushing located inside of said container and receiving said end of said shaft.

14. The rotary filtration apparatus as in claim 13, wherein said container has a concentrate outlet, wherein said bottom plate having an aperture for the transport of concentrate through said bottom plate into said space and out of said concentrate outlet, wherein said bushing is carried by said bottom plate.

15. The rotary filtration apparatus as in claim 12, wherein said shaft and said disk stack are configured for removal from said container as a single assembly.

16. The rotary filtration apparatus as in claim 12, further comprising a plurality of separator plates disposed between said filtration disks, wherein said separator plates are attached to said plurality of tie rods such that rotation of said filtration disks cause relative rotation between said filtration disks and said separator plates.

17. The rotary filtration apparatus as in claim 12, wherein said filtration disks have a steel base plate that carries a steel wire mesh on either side thereof, and wherein each of said steel wire mesh carries a steel membrane configured to filter a fluid.

18. The rotary filtration apparatus as in claim 12, further comprising a bellows seal surrounding a portion of the length of said shaft, wherein said disk stack is positioned intermediate said bellows seal and an end of said shaft.

19. The rotary filtration apparatus as in claim 12, further comprising an around the shaft union rotary joint surrounding a portion of the length of said shaft, wherein said around the shaft union rotary joint has a port for communication with a permeate outlet of said shaft such that said around the shaft union rotary joint and said shaft are configured to allow permeate to flow from said passageway to said permeate outlet and then out of said port of said around the shaft union rotary joint.

20. A rotary filtration apparatus, comprising:
a container having a feed fluid inlet and a concentrate outlet, said container having a vessel lid, wherein said container has a side wall, and wherein a bottom plate, said lid, and said side wall define a filtering section;
a shaft at least partially disposed in said container, said shaft defining a passageway for the transport of permeate therethrough, wherein the permeate is transported out of said container through said lid;
a disk stack made of a plurality of filtration disks mounted onto said shaft such that rotation of said shaft causes rotation of said filtration disks, wherein said filtration disks have a steel base plate that carries a steel wire mesh on either side thereof, and wherein each of said steel wire mesh carries a steel membrane configured to filter a fluid, wherein said steel base plates of said filtration disks define an aperture through which said shaft is disposed, and wherein said steel base plates of said filtration disks define a notch to define a flow path through said filtration disks of said disk stack, wherein said disk stack is located between said lid and said bottom plate, wherein feed fluid enters said filtering section through said side wall, and wherein concentrate exits said filtering section through said bottom plate;
a plurality of separator plates disposed between said filtration disks;
a plurality of tie rods supporting said separator plates and attached to said vessel lid;
said bottom plate attached to said tie rods and spaced a distance from a bottom of said container so as to define a space between said bottom plate and the bottom of said container, said bottom plate having an aperture to allow concentrate to be transported through said bottom plate, wherein said bottom plate engages said side wall of said container and defines a recess into which an end of said shaft is located, wherein fluid is prevented from exiting through said bottom plate at said recess;
a bushing carried by said bottom plate and receiving said shaft;
a bellows seal surrounding a portion of the length of said shaft, wherein said vessel lid is positioned intermediate said bellows seal and said disk stack; and
an around the shaft union rotary joint surrounding a portion of the length of said shaft, wherein said around the shaft union rotary joint has a port for communication with a permeate outlet of said shaft such that said around the shaft union rotary joint and said shaft are configured to allow permeate to flow from said passageway to said permeate outlet and then out of said port of said around the shaft union rotary joint;
wherein said shaft, said disk stack, said separator plates, said tie rods, said bottom plate, said bushing, said bellows seal, and said around the shaft union rotary joint are configured for removal from said container as a single assembly.

* * * * *